(12) United States Patent
Caruso et al.

(10) Patent No.: US 6,553,294 B1
(45) Date of Patent: Apr. 22, 2003

(54) DUAL STAGE OCCUPANT RESTRAINT DEPLOYMENT CONTROL FOR MOTOR VEHICLE

(75) Inventors: Christopher Michael Caruso, Kokomo, IN (US); Sheri Lynn Patterson, Greentown, IN (US); Shyam V. Potti, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 179 days.

(21) Appl. No.: 09/690,141

(22) Filed: Oct. 16, 2000

(51) Int. Cl.[7] .................................................. G06F 7/00
(52) U.S. Cl. ........................ 701/45; 180/271; 280/735
(58) Field of Search ............................... 701/45, 46, 47; 180/271, 282, 283; 280/734, 735; 307/10.1; 340/669

(56) References Cited

U.S. PATENT DOCUMENTS

| | | | | |
|---|---|---|---|---|
| 5,339,242 A | * | 8/1994 | Reid et al. ..................... 701/45 |
| 5,483,449 A | * | 1/1996 | Caruso et al. ................. 701/46 |
| 5,521,822 A | * | 5/1996 | Wang .......................... 701/45 |
| 5,978,722 A | * | 11/1999 | Takasuka et al. .............. 701/45 |
| 6,095,554 A | * | 8/2000 | Foo et al. .................... 280/735 |
| 6,330,500 B1 | * | 12/2001 | Moriyama et al. ............. 701/45 |

* cited by examiner

Primary Examiner—William A. Cuchlinski, Jr.
Assistant Examiner—Edward Pipala
(74) Attorney, Agent, or Firm—Robert M. Sigler

(57) ABSTRACT

A dual stage occupant restraint deployment control provides a signal for first stage restraint deployment if, during a sensed possible crash event, a velocity value derived from a sensed acceleration and one or more immunity measures meet predetermined criteria. A second stage restraint deployment signal is provided if a crash severity measure derived from the time rate of change of the sensed acceleration meets predetermined criteria and the first stage activation signal has been generated. The method and apparatus ensure that the immunity criteria are met for both first and second stage deployment without repeated testing if the crash severity measure is vulnerable to non-crash accelerations produced by "misuse" events and rough road driving. The crash severity measure may be the time rate of change of the acceleration itself, an oscillation value derived this time rate of change of the acceleration with a velocity value requirement in the predetermined criteria, or a veloscillation value derived as a scaled sum of the oscillation value and the velocity value.

19 Claims, 6 Drawing Sheets

DUAL STAGE OCCUPANT RESTRAINT DEPLOYMENT CONTROL FOR MOTOR VEHICLE

TECHNICAL FIELD

The technical field of this invention is the deployment of an occupant restraint in a motor vehicle during a vehicle crash event.

BACKGROUND OF THE INVENTION

The control of occupant restraints for motor vehicles is becoming more complex with development of multiple stage restraints, wherein the initial detection of a crash signals a first stage deployment and a second stage deployment is signaled only in a more severe crash. Thus, a requirement for such systems is a crash severity measurement system for second stage deployment that is accurate, reliable and as economical as possible. The problems include the complexity of the task, the difficulty of accurately and reliably distinguishing crash from non-crash events with the available sensors, and the memory load placed on microcomputers used in the control, since the volume of code required appears to be increasing faster than the cost of CPU and memory capacity is falling.

SUMMARY OF THE INVENTION

The method and apparatus of this invention is a dual stage occupant restraint deployment control that is accurate, reliable and cost effective. It is particularly directed toward such a system for use in a passenger compartment located acceleration sensor and including a dual stage restraint system for frontal crashes, although it is not necessarily limited to such systems.

The method and apparatus of this invention provides a signal for first stage restraint deployment if, during a sensed possible crash event, a velocity value derived from a sensed acceleration and one or more immunity measures meet predetermined criteria. A second stage restraint deployment signal is provided if a crash severity measure derived from the time rate of change of the sensed acceleration meets predetermined criteria and the first stage activation signal has been generated. The method and apparatus ensure that the immunity criteria are met for both first and second stage deployment without repeated testing if the crash severity measure is vulnerable to non-crash accelerations produced by "misuse" events and rough road driving. The crash severity measure may be the time rate of change of the acceleration itself, an oscillation value derived this time rate of change of the acceleration with a velocity value requirement in the predetermined criteria, or a veloscillation value derived from the oscillation value and the velocity value.

DESCRIPTION OF THE PREFERRED EMBODIMENT

Figure 1:
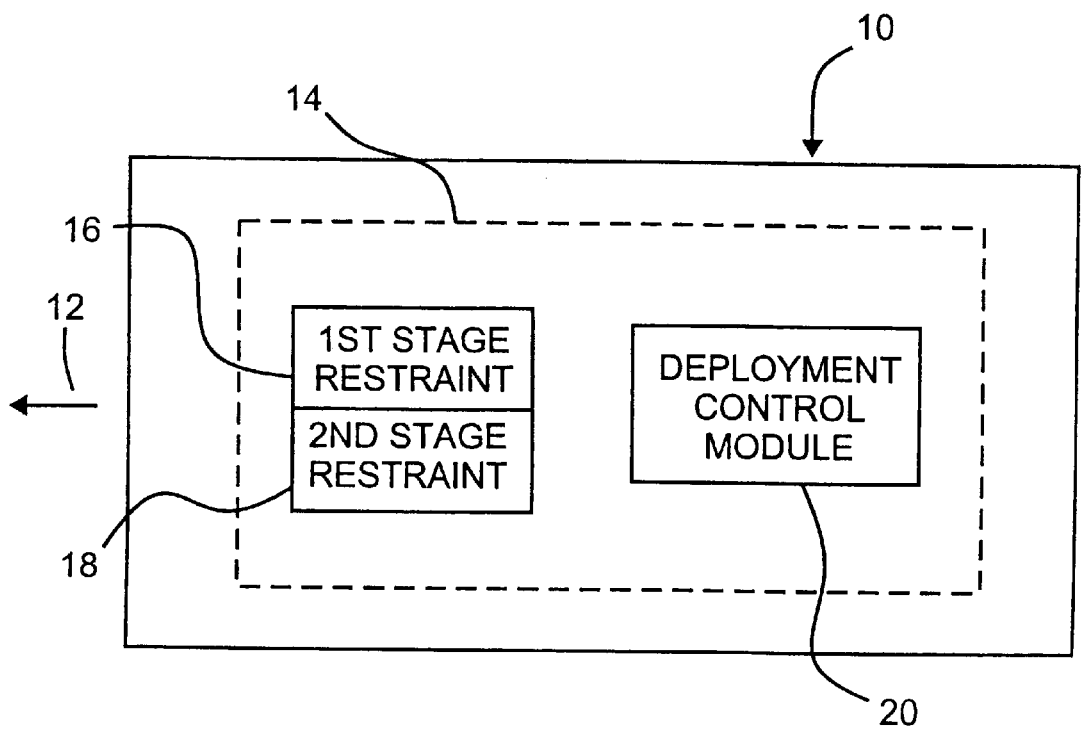
FIG. 1 shows a block diagram of a motor vehicle having a dual stage restraint system with a control according to this invention.
Figure 2:
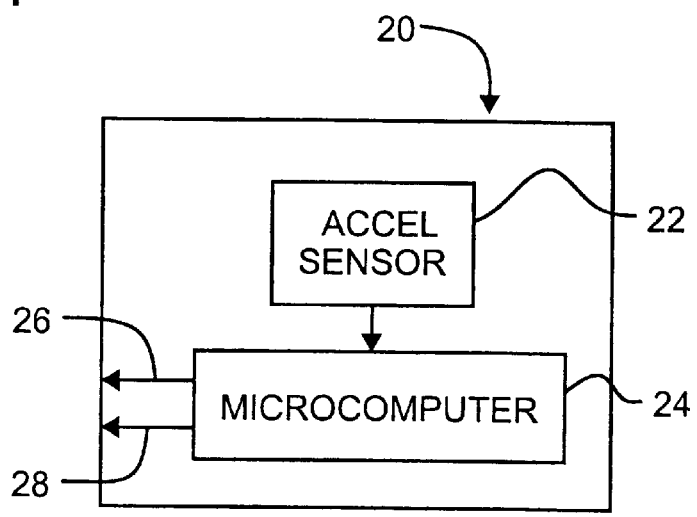
FIG. 2 shows a block diagram of a dual stage restraint control for use in the vehicle of FIG. 1.

Referring to FIG. 1, a motor vehicle 10 has a front indicated by directional arrow 12. Vehicle 10 has a passenger compartment 14 containing a dual stage restraint system comprising a first stage restraint 16, a second stage restraint 18 and a deployment control 20 that controls the initiation of each of restraints 16 and 18. In this embodiment, restraints 16 and 18 are dual inflatable restraints, one of which is intended to be deployed in a detected crash event of a first severity and the other is intended to be employed in addition in a crash of a second, higher severity. FIG. 2 shows that control 20 includes an acceleration sensor 22 that measures the longitudinal acceleration of the vehicle passenger compartment 14 and a microcomputer 24 that receives the output signal of acceleration sensor 22 and runs a stored program for determining if and when to generate deployment signals for restraints 16 and 18 on lines 26 and 28, respectively.

The program stored in microcomputer 24 for controlling the deployment of first stage restraint 16 and second stage restraint 18 is illustrated with reference to FIG. 3. Program DEPLOY begins by sampling the longitudinal acceleration output signal of sensor 22 in step 40. The sampled signal ACCEL includes any desired filtering for noise reduction or other purposes. A velocity signal VELOCITY is derived in step 42 by integrating or equivalently digitally accumulating the acceleration signal ACCEL. In step 44, the program next calls a subroutine to calculate an Event Progression Measure EPM.

Figure 4:
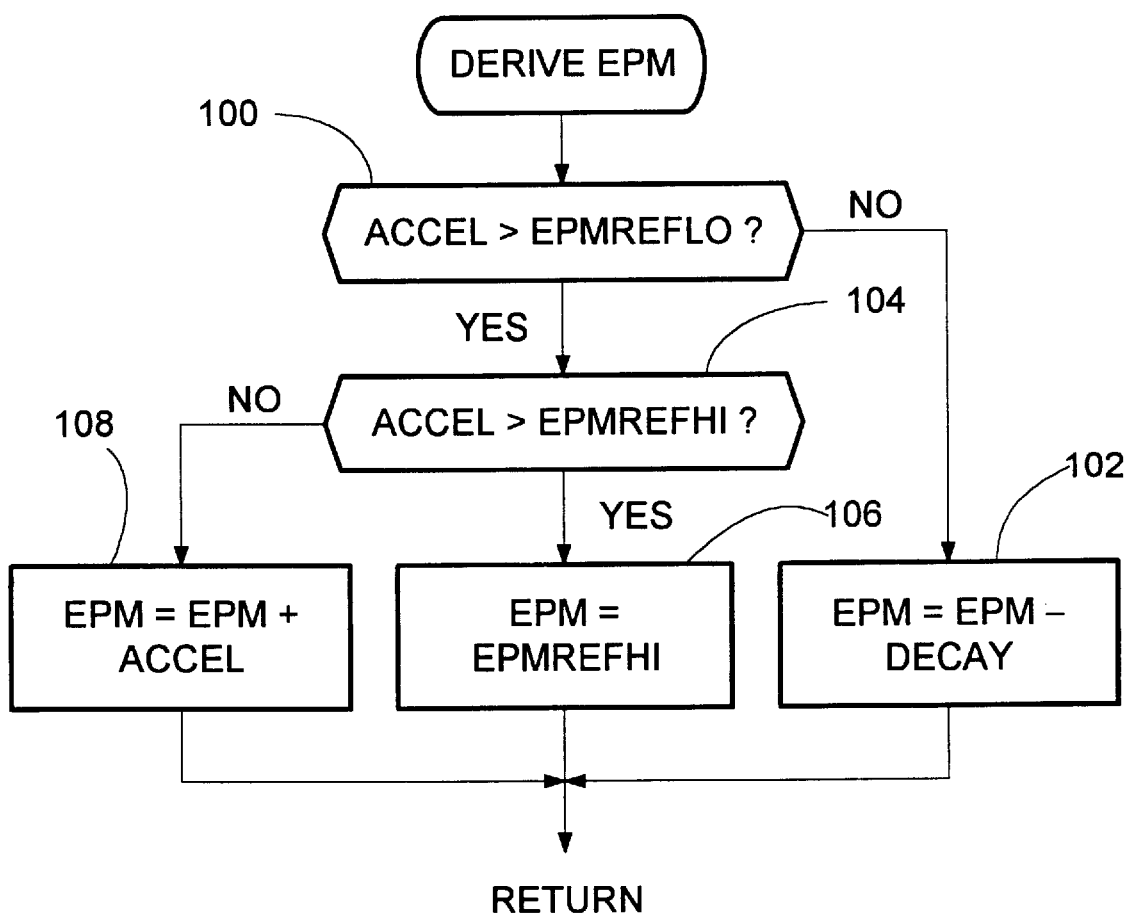

The Event Progression Measure is an immunity measure used to discriminate crash events from other events that have high velocities at the level indicative of a crash but of shorter duration. Lower and upper EPM reference levels are defined for the acceleration signal ACCEL; and signal ACCEL is integrated or accumulated positively when it exceeds the lower EPM reference level, but with its value limited to the upper EPM reference level. It is decayed toward zero when it does not exceed the lower EPM reference level. The program logic of this measure is described with reference to FIG. 4. Subroutine DERIVE EPM begins by comparing ACCEL with a lower EPM reference EPMREFL at step 100. If it is not greater, EPM is decayed at step 102. If it is greater, ACCEL is compared with the upper EPM reference EPMREFU at step 104. If it is greater, EPM is increased by EPMREFU at step 106. If it is not greater, EPM is increased by ACCEL at step 108. From any of steps 102, 106 and 108, the subroutine returns.

Figure 5:
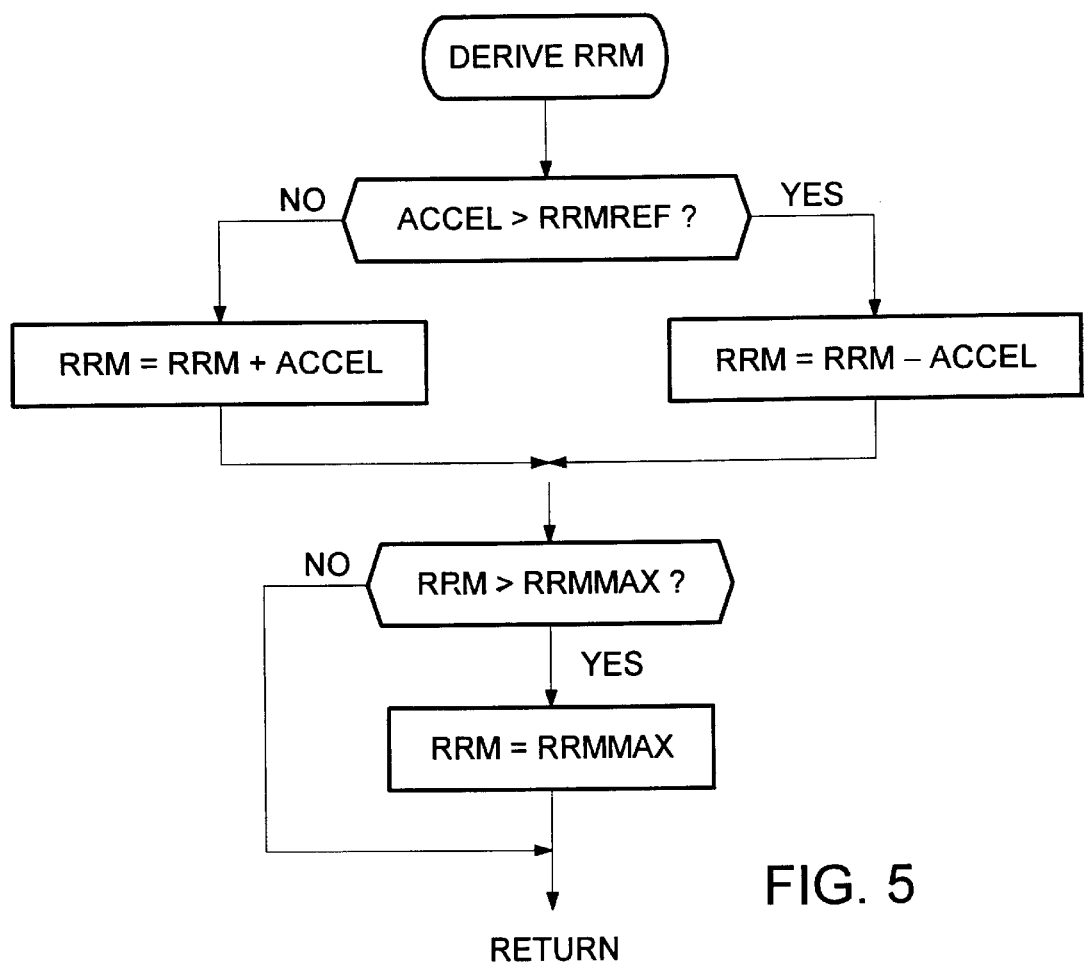

Returning to FIG. 3, the next step 46 of program DEPLOY calls a subroutine to derive a Rough Road Measure RRM. This measure is another immunity measure that complements the EPM. RRM reveals a condition of driving over a rough road producing accelerations over an extended period that are greater than usual but somewhat lower than those indicative of a crash. An RRM reference level is defined for the acceleration signal ACCEL; and signal ACCEL is integrated or accumulated positively when it is in the range below the reference level while the algorithm is active. The level of RRM is limited; and it is decayed toward zero when ACCEL exceeds the RRM reference level. The program logic of this subroutine is illustrated with reference to FIG. 5. Subroutine DERIVE RRM begins at step 120 by comparing ACCEL to an RRM reference level RRMREF. If it is not greater, RRM is increased by ACCEL in step 122. If it is greater, RRM is decreased by ACCEL at step 124. From either of steps 122 and 124, the program proceeds to step 126, in which RRM is compared to a maximum allowed value RRMMAX. If it is greater, RRM is set equal to RRMMAX at step 128. Otherwise, or from step 128, the program returns from the subroutine.

Returning to FIG. 3, program DEPLOY next derives at step 48 a slope or jerk value SLOPE. This is the time derivative of the acceleration ACCEL and is obtained in a simple digital approximation by the following equation:

SLOPE=ACCEL−PRIORACCEL.

Program DEPLOY then derives at step 50 an oscillation value OSC. The method of deriving this value is shown in the prior art in U.S. Pat. No. 5,483,449, issued Jan. 9, 1996 to Caruso et al. Essentially, the oscillation OSC equals the time integral (or digital accumulation) of the absolute value of the slope or jerk of the sampled acceleration ACCEL. In this program, the value SLOPE was derived above in step 48. Thus, the oscillation OSC may be derived in simple digital accumulation by the following equation:

OSC=OSC+*ABS*(SLOPE).

Program DEPLOY now determines whether an EVENT flag is set. This flag indicates that the apparatus or method has determined that a possible crash event is in progress. The prior art is acquainted with many ways of accomplishing this; one particular method is testing the sensed acceleration value against a predetermined value somewhat higher than that produced in normal braking; e.g., about 2 g's. If program DEPLOY determines at step 52 that an EVENT flag is not set, then there is no possible crash event initiated; and the program skips the rest of the steps described herein. But if the EVENT flag is set, the program proceeds to group of tests to determine if first stage deployment is to be indicated. In step 54, the program determines if the EPM value is greater than a threshold EPMTHRESH. If it is, then the RRM value is compared with a threshold RRMTHRESH in step 56. If it is less than the threshold, VELOCITY is compared with a first stage velocity threshold VELTHRESH1 in step 58. If it is greater, than the 1ST STAGE DEPLOY flag is set in step 60. The setting of this flag is a signal for the deployment of first stage restraint 16, which will be caused in the normal manner known in the art. But if the opposite result is obtained in any of the tests of steps 54–58, the rest of those steps, plus step 60, are skipped, and the 1ST STAGE DEPLOY flag is not set.

The program then proceeds to test for second stage deployment, starting with step 62, in which the value SLOPE (jerk) is compared with a threshold value SLTHRESH. If it is greater, the program proceeds to check the 1ST STAGE DEPLOY flag in step 68. If the flag is set, then the 2ND STAGE DEPLOY flag is set in step 70. The setting of this flag is a second stage deployment signal that leads to deployment of second stage restraint 18 in a manner, and under timing conditions, well known in the art. The checking of the 1ST STAGE DEPLOY flag in step 68 is critical to second stage deployment, since the SLOPE (jerk) parameter, which is the slope or derivative of acceleration ACCEL, is vulnerable to false crash indications caused by hammer blows or rough road driving. The EPM and RRM measures used in the determination of first stage deployment are necessary for accurate determination of second stage deployment; but the comparisons do not have to be repeated if the 1ST STAGE DEPLOY flag is set.

An alternative criterion for second stage deployment is provided. From step 62, if SLOPE did not exceed the threshold, the oscillation variable OSC is compared at step 64 with a threshold OSCTHRESH. If it is greater, VELOCITY is compared at step 66 with a second stage velocity threshold VELTHRESH2. If it exceeds the threshold, then the program proceeds to check the 1ST STAGE DEPLOY flag in step 68 and set the 2ND STAGE DEPLOY flag in step 70 if the 1ST STAGE DEPLOY flag is set. But if any of steps 64–68 provide the opposite result, the 2ND STAGE DEPLOY flag is not set; and second stage restraint 18 is not deployed.

Figure 3A:
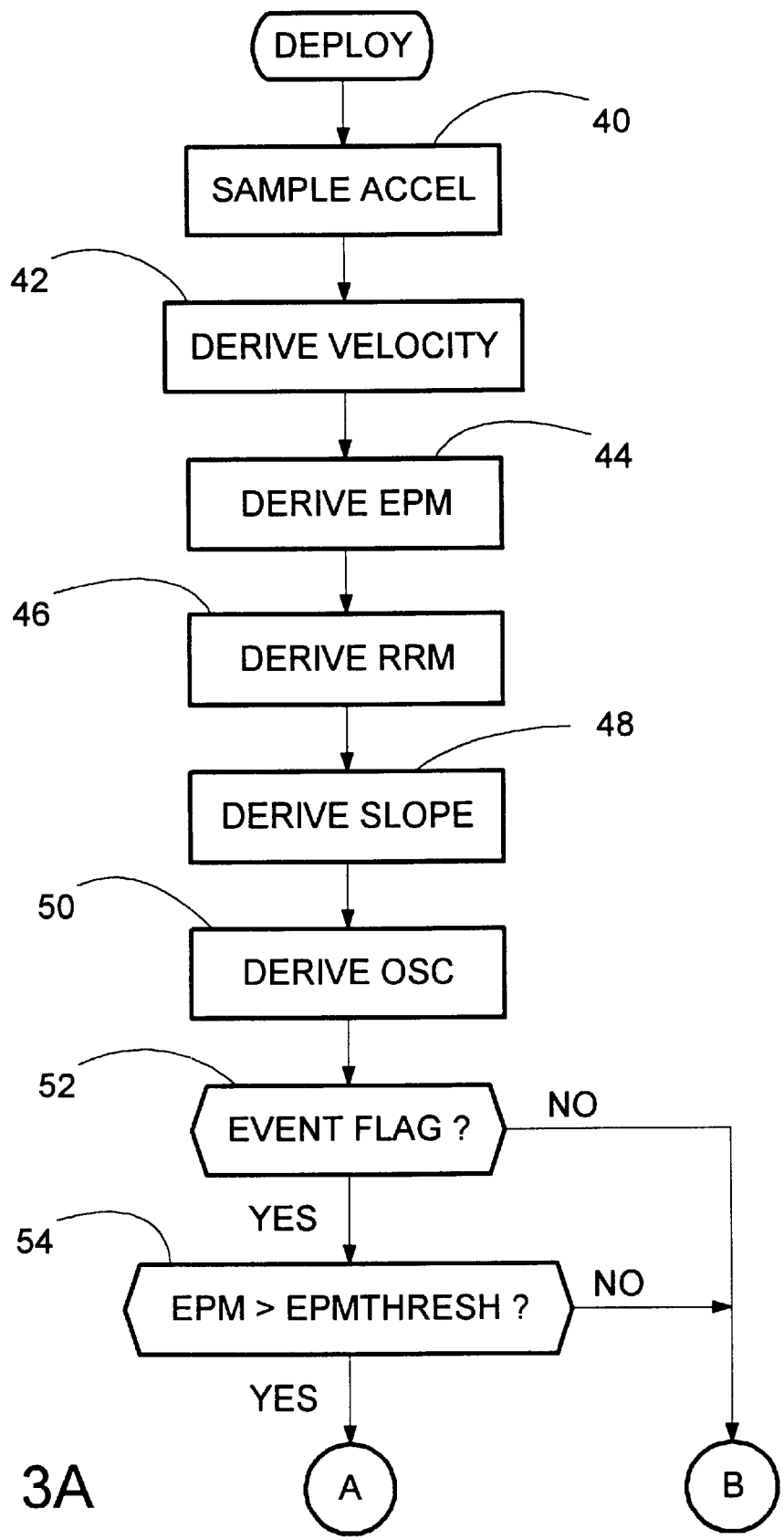
FIGS. 3–5 show flow charts illustrating the operation of the control of FIG. 2.
Figure 3B:
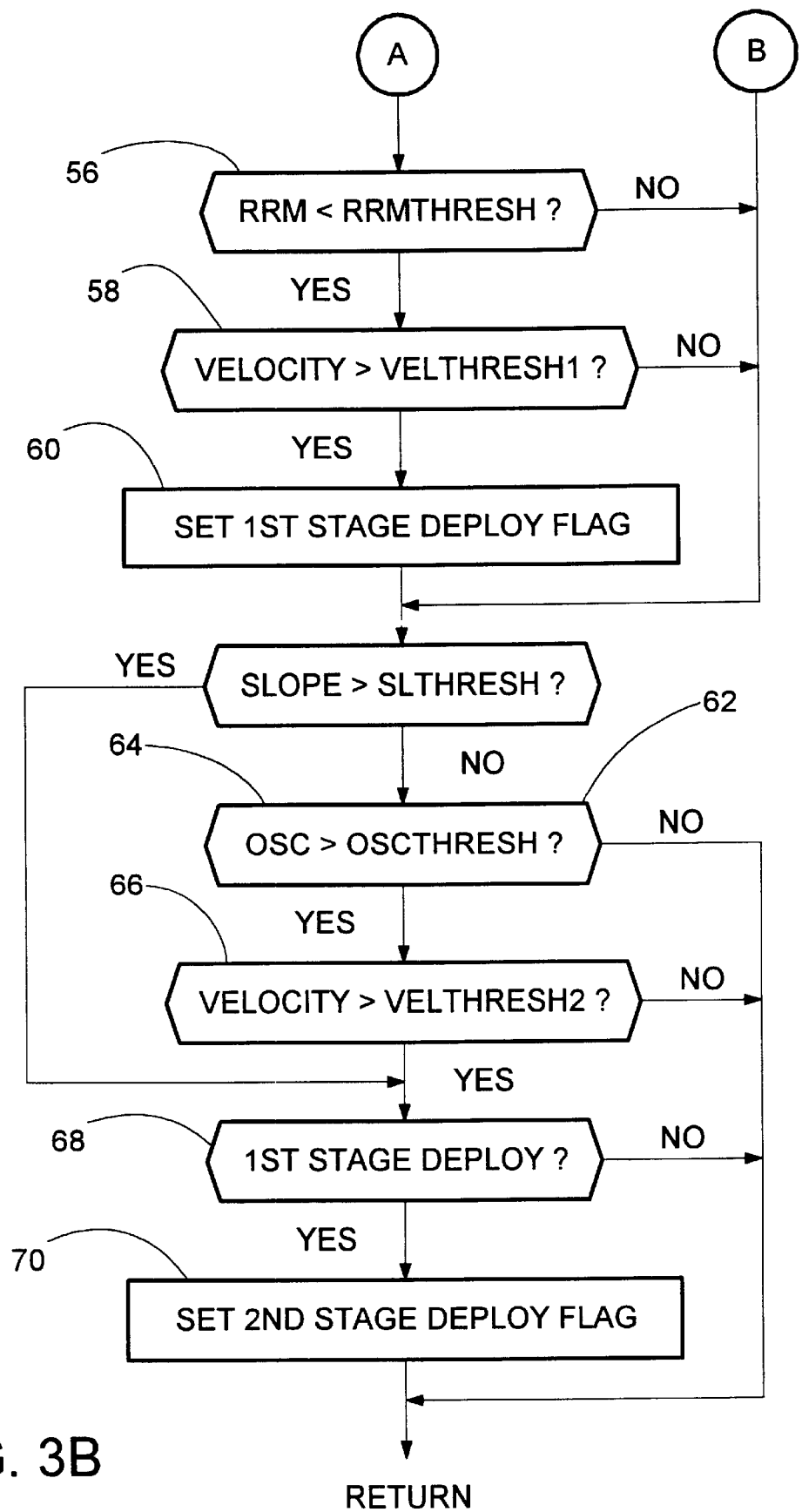
Figure 6:
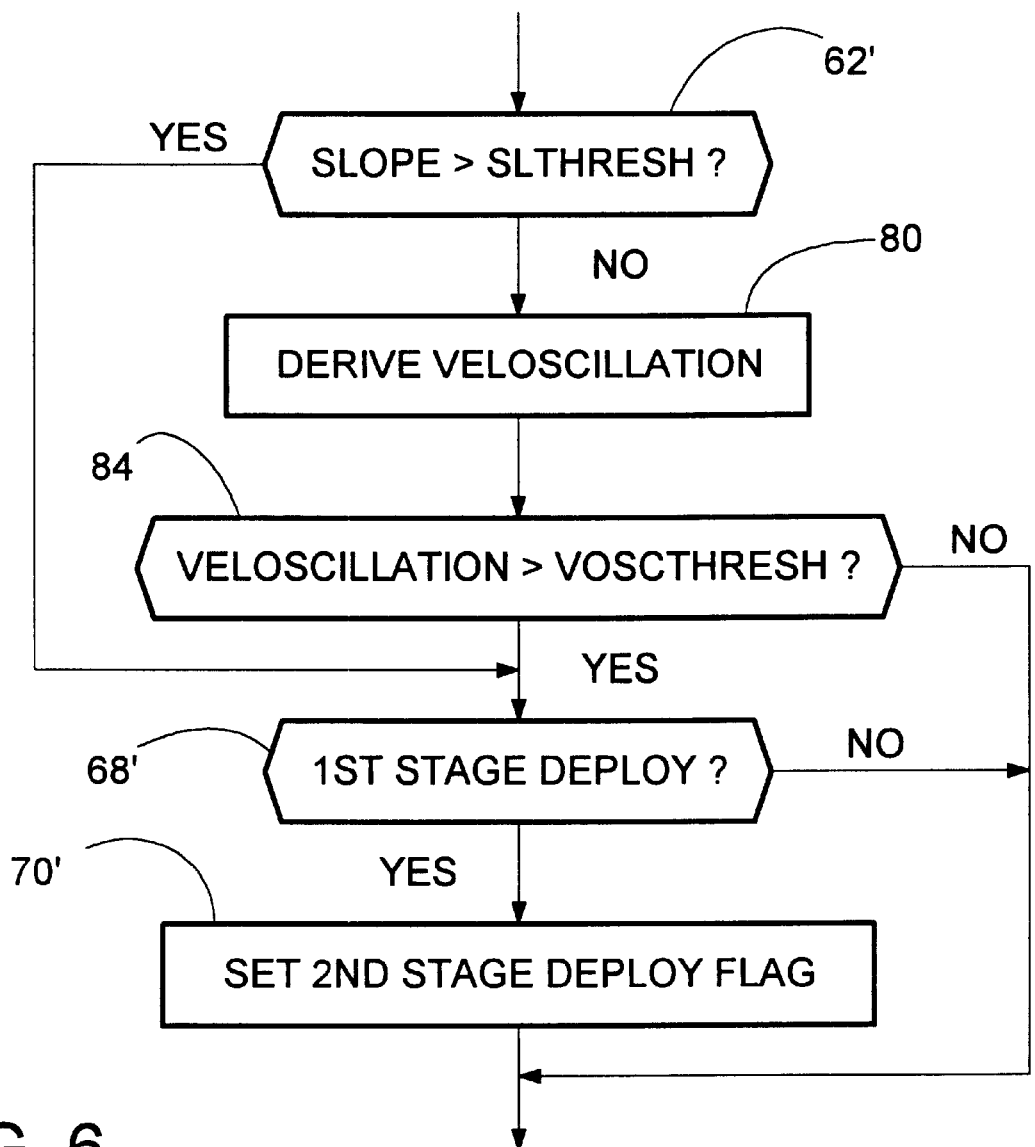
FIG. 6 shows a variation of the flow chart of FIG. 3 illustrating the operation of an alternative embodiment.

The alternative criterion for second stage deployment, wherein both OSCILLATION and VELOCITY must exceed thresholds, may be accomplished in a manner requiring somewhat fewer computer memory resources, as described with respect to the flow chart of FIG. 6, which shows an alternative to part of FIG. 3 and in which like steps have numerically identical, but primed, reference numbers. Referring to FIG. 6, if SLOPE is found in step 62' to be not greater than the threshold, a new value VELOSCILLATION is derived in step 80. VELOSCILLATION is a combination of OSCILLATION and VELOCITY and is derived according to the following equation:

VELOSCILLATION=OSCILLATION+WT*VELOCITY, wherein WT is a weighting factor that scales VELOCITY with respect to OSCILLATION and is preferably a power of two so that the multiplication may be performed by register shift(s) on the VELOCITY. The derived VELOSCILLATION value is then compared with a threshold VOSCTHRESH at step 84. If it is greater, then the program proceeds to step 68'; and the program from here is as described above with respect to FIG. 3B. It is found that, with properly calibrated values for WT and VOSCTHRESH, the single threshold test of VELOSCILLATION tracks well with the dual threshold tests of OSCILLATION and VELOCITY; but there is a significant saving of computer memory resources.

What is claimed is:

1. A method for controlling the deployment of a dual stage occupant restraint in a motor vehicle comprising the steps:

sensing a possible crash event;

sensing a vehicle acceleration and deriving therefrom an acceleration signal;

deriving a velocity signal from the acceleration signal;

deriving one or more immunity measures for indicating non-crash events;

generating a first stage activation signal if the velocity value and all derived immunity measures meet predetermined criteria during the sensed possible crash event;

deriving a crash severity measure from the acceleration signal, the crash severity measure not being immune from accelerations due to non-crash events; and generating a second stage activation signal in response to the crash severity measure meeting predetermined criteria if the first stage activation signal has been generated.

2. The method of claim 1 in which the crash severity measure is derived from a time rate of change of the sensed acceleration.

3. The method of claim 2 in which the crash severity measure is an oscillation value derived from the time integral of the absolute value of the time derivative of the acceleration and the predetermined criteria comprise a predetermined value of the velocity signal.

4. The method of claim 2 in which the crash severity measure is derived from (1) an oscillation value derived from the time integral of the absolute value of the time derivative of the acceleration and (2) the value of the velocity signal.

5. The method of claim 4 in which the crash severity measure is a scaled sum of the oscillation value and the value of the velocity signal.

6. The method of claim 1 in which the immunity measure is a misuse measure indicative of quick blows to the vehicle producing high accelerations of duration shorter than those produced by a crash.

7. The method of claim 6 further using an immunity measure indicating operation of the vehicle on a rough road.

8. The method of claim 1 in which the immunity measure is a indicative of operation of the vehicle on a rough road.

9. The method of claim 1 further comprising the steps:

deploying a first stage of the dual stage occupant restraint in response to the first stage activation signal; and deploying a second stage of the dual stage occupant restraint in response to the second stage activation signal.

10. A method for controlling the deployment of an occupant restraint in a motor vehicle comprising the steps:

sensing a possible crash event;

sensing a vehicle acceleration and deriving therefrom an acceleration signal;

deriving a velocity signal from the acceleration signal;

deriving a crash severity measure as the scaled sum of (1) an oscillation value derived from the time integral of the absolute value of the time derivative of the acceleration and (2) the value of the velocity signal.

11. The method of claim 10 for use in a digital computer in which the vehicle acceleration signal is obtained by inputting to the computer a repeatedly sampled output of a vehicle mounted acceleration sensor.

12. The method of claim 11 in which the velocity signal is derived as a sum of consecutive values of the acceleration signal.

13. The method of claim 12 in which the oscillation signal is derived in the steps:

deriving a slope value as the difference between consecutive acceleration signals; and deriving the time derivative of the acceleration signal as an accumulation of the absolute values of consecutive slope values.

14. The method of claim 13 in which the crash severity measure is derived by register shifting the derived velocity signal to obtain a scaled velocity signal and summing the scaled velocity signal with the oscillation signal.

15. Apparatus for controlling the deployment of a dual stage occupant restraint in a motor vehicle comprising:

means for sensing a possible crash event;

means for deriving a vehicle acceleration signal;

means for deriving a velocity signal from the vehicle acceleration signal;

means for deriving one or more immunity measures for indicating non-crash events;

means for generating a first stage activation signal if the velocity value and all derived immunity measures meet predetermined criteria during the sensed possible crash event;

means for deriving a crash severity measure from the acceleration signal, the crash severity measure not being immune from accelerations due to non-crash events; and means for generating a second stage activation signal in response to the crash severity measure meeting predetermined criteria if the first stage activation signal has been generated.

16. Apparatus according to claim 15 further comprising:

means for deploying a first stage of the dual stage occupant restraint in response to the first stage activation signal, and means for deploying a second stage of the dual stage occupant restraint in response to the second stage activation signal.

17. Apparatus according to claim 15 further comprising means for deriving the crash severity measure from a time rate of change of the sensed acceleration.

18. Apparatus according to claim 17 in which the crash severity measure is derived from (1) an oscillation value derived from the time integral of the absolute value of the time derivative of the acceleration and (2) the value of the velocity signal.

19. Apparatus according to claim 18 in which the crash severity measure is a scaled sum of the oscillation value and the value of the velocity signal.

* * * * *